2,209,929

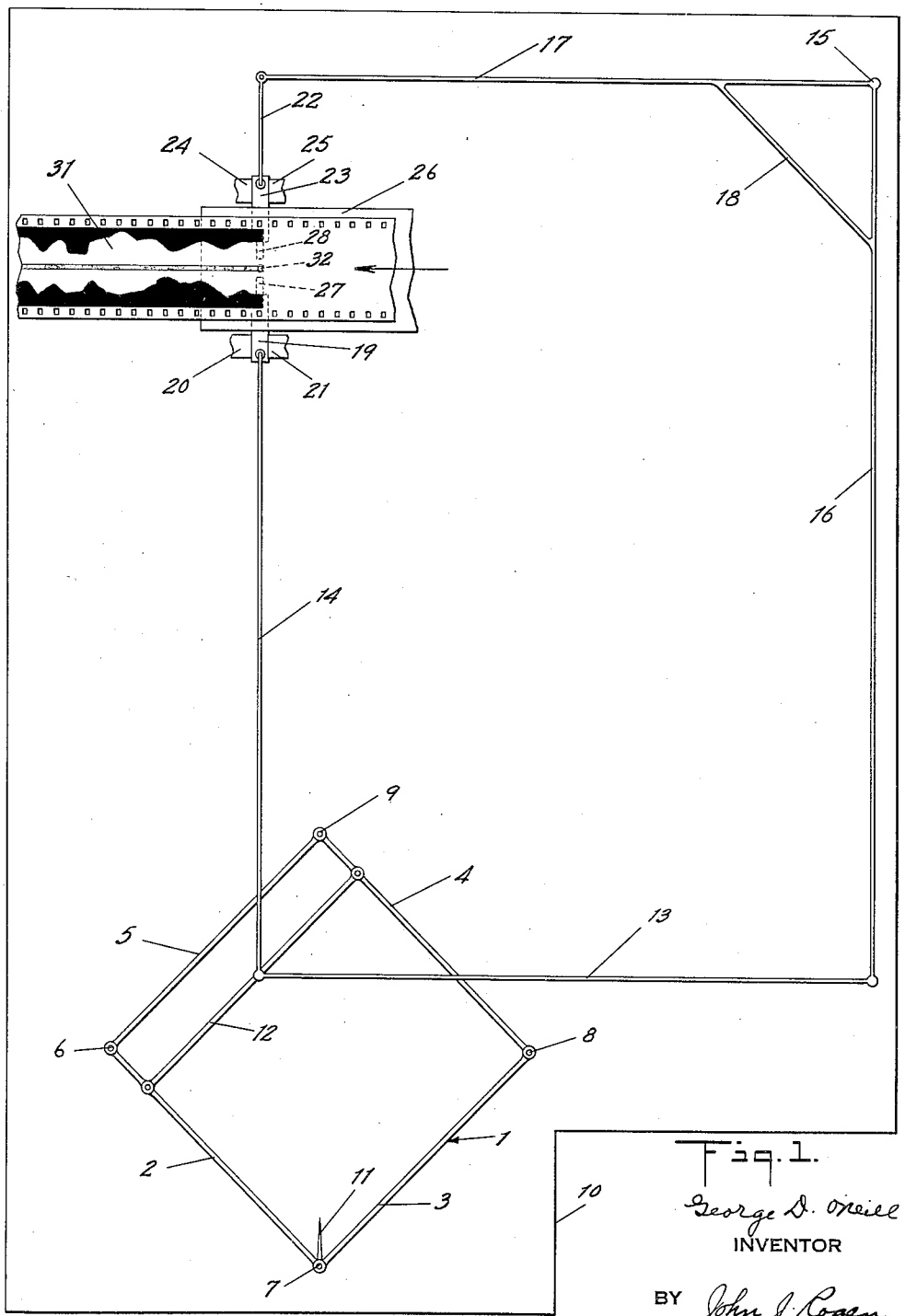

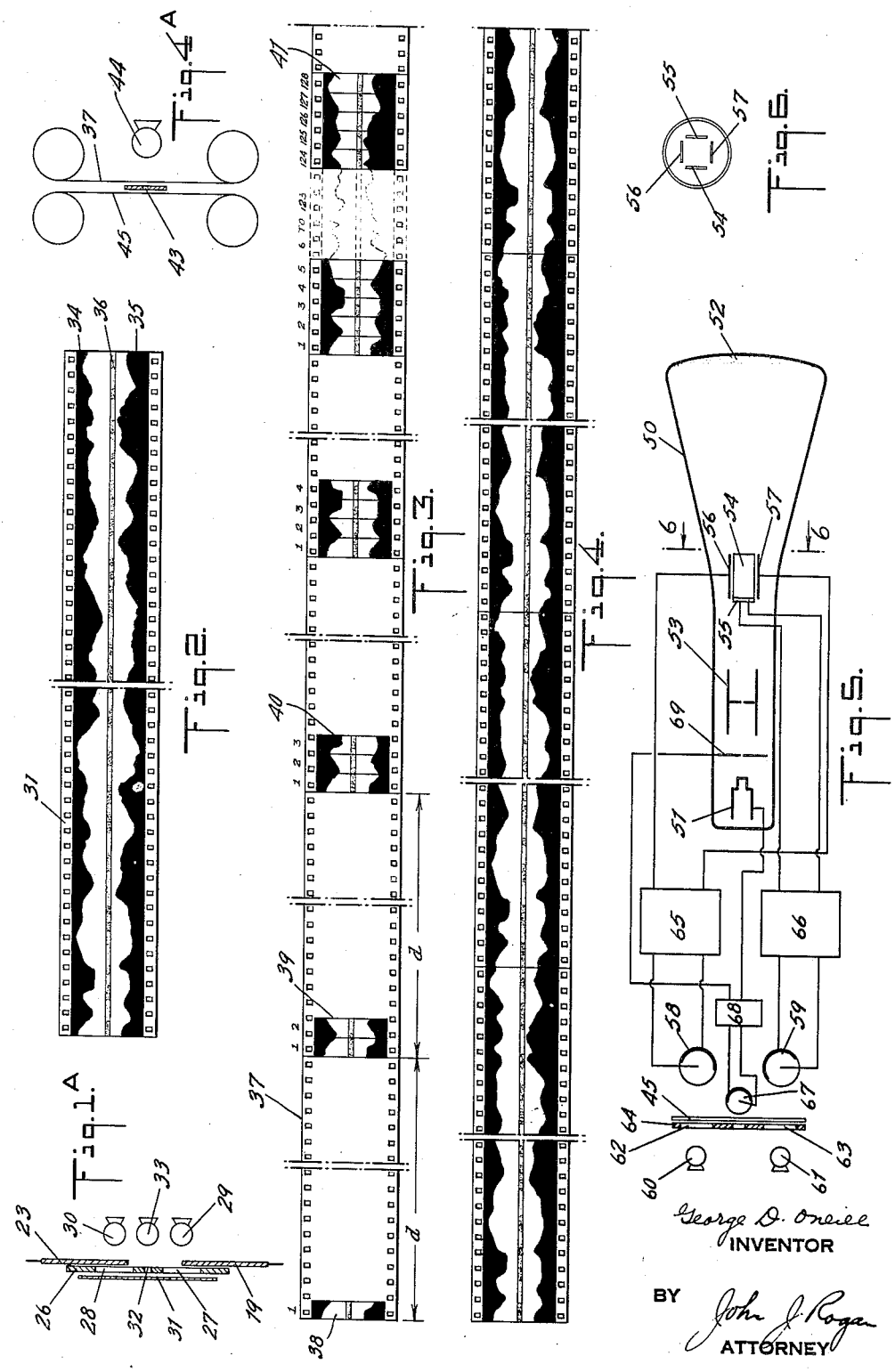
July 30, 1940. G. D. O'NEILL 2,209,929
ELECTROGRAPHIC SYSTEM AND APPARATUS
Filed Nov. 20, 1937 2 Sheets-Sheet 2
George D. O'Neill
INVENTOR
BY John J. Rogan
ATTORNEY Patented July 30, 1940

UNITED STATES PATENT OFFICE 2,209,929

ELECTROGRAPHIC SYSTEM AND APPARATUS

George D. O'Neill, Beverly, Mass., assignor to Hygrade Sylvania Corporation, Salem, Mass., a corporation of Massachusetts Application November 20, 1937, Serial No. 175,636

1 Claim. (Cl. 178—6.8)

This invention relates to electrographic systems and more especially to systems for displaying a visual representation under control of electric currents.

A principal object of the invention is to provide a method of electrographically displaying a visual representation under control of a cathode ray beam.

Another object of the invention relates to a method of creating and controlling a moving luminous display through the intermediary of a fluorescent screen.

Another object is to provide a novel method of producing a mechanical record of a visual representation for controlling the electro-optical reproduction thereof.

A feature of the invention relates to the novel apparatus for analyzing and translating the characteristics of a visual representation into an intermediate photographic record.

Another feature relates to a photographic film having a pair of tracks each having variations representative of the spacial coordinates of a visual representation to be reproduced under control of a cathode ray tube or the like.

A further feature relates to a novel form of advertising display apparatus employing a cathode ray tube for reproducing the display.

A further features relates to a method of reproducing a visual representation on the fluorescent screen of a cathode ray tube by employing coordinate ray deflecting fields which are varied under control of a mechanical record such as a photographic film or the like.

A still further feature relates to the novel organization, arrangement and methods of controlling the cathode ray beam of a cathode ray tube for producing an advertising display or other visual representation.

Other features and advantages not specifically enumerated will be apparent after a consideration of the following detailed descriptions and the appended claim.

Since the invention is primarily directed to the use of a coordinately movable scanning beam such as a cathode ray beam for producing a visual representation, only those parts of the electrical control system will be disclosed herein as are necessary to a complete understanding of the inventive concept. Accordingly in the drawings—

Fig. 1 shows in diagrammatic form apparatus for converting the matter to be displayed, into a pair of coordinate records on a movable film.

Fig. 1ª is a detailed view of the shutter mechanism of Fig. 1.

Fig. 2 shows a typical master film record of the visual representation produced by the apparatus of Fig. 1.

Figs. 3 and 4 are views of a film formed from a series of master films like that of Fig. 2 to control various stages of the final display.

Fig. 4ª is a schematic diagram of the film condensing and printing apparatus.

Fig. 5 is a schematic diagram of an electrical system that is controlled by the films of Figs. 3 and 4.

Fig. 6 is a detailed view of the deflecting electrodes of the cathode ray tube of Fig. 5.

Referring more particularly to Fig. 1 of the drawings, the numeral 1 indicates generally a pantograph mechanism of any known type such for example as used in telautographic systems and the like. The pantograph frame comprises the frame members 2, 3, 4 and 5 each of which is independently pivotally supported on the movable pivots 6, 7, 8 and on the pivot 9 which is fastened to the table or other support 10 which carries the recording mechanism to be described. Carried by the pivot 7 is a tracer or stylus 11. Pivotally fastened to the frame members 2 and 4 is a cross-bar 12 to which is pivotally attached the horizontal link 13 and vertical link 14. Pivotally fastened to the table 10 at the point 15 is a bell-crank comprising the vertical arm 16 and the horizontal arm 17 united by the strut 18. Arm 14 is pivotally fastened to the shutter 19 which is slidable in suitable guides 20, 21. Likewise arm 17 is pivotally attached to an arm 22 which is pivotally attached to shutter 23, the latter being slidable between the guides 24, 25. Consequently the movement of the stylus 11 is analyzed into the vertical and horizontal components thereof thus resulting in corresponding proportional sliding movements of the shutters 19, 23.

Associated with the shutters is an aperture plate (Fig. 1ª) having a pair of slits 27, 28 and a corresponding pair of light sources 29, 30 for exposing the continuously moving light-sensitized film strip 31 under control of said shutters. If desired, a single light source may be employed in place of the two light sources shown. Plate 26 may also include a small square or rectangular aperture 32 having associated therewith either a shutter similar to shutters 19 and 23, or a light source 33 of variable intensity may be employed, the intensity of which is varied in accordance with the light shading desired in the final reproduction. For example lamp 33 may be connected in circuit with a potential source and a variable resistance the instantaneous magnitude of the latter being varied by the pressure on the stylus or in accordance with the light shading of the representation being analyzed by the stylus or to be reproduced as described below.

Fig. 2 shows a typical master film produced under control of the mechanism of Figs. 1 and 1a. The black variable area record adjacent the upper edge of the film represents the instantaneous horizontal component of the stylus movement, and the black variable record adjacent the lower edge of the film represents the instantaneous vertical component of the stylus movement. The variable density record 36 along the center of the film represents the instantaneous pressure on the stylus and therefore the instantaneous brightness of the successive image points to be reproduced.

The film 7 of Fig. 2 may be used in any suitable manner to control the reproduction of the original record as traced by the stylus 11. Preferably, and in accordance with the present invention, the record of Fig. 2 is used to control the scanning beam of a cathode ray tube of any well-known type such as is used in oscillographs and television reproducing systems.

Where the message or other visual display is to be viewed directly, in the same manner as a television image, since such image is reproduced in the form of a scanning spot moving along successive elemental areas of the fluorescent screen of the cathode ray tube, it becomes necessary to have the cathode ray beam retrace the display a certain minimum number of times per second as is well known in the television art. For example, assume that the display is to show the progressive writing of the letters "ABC", the writing to take four seconds, and when completed it is to stay on the screen for an additional two seconds. Under these conditions it is necessary to make a composite film from the original master film of Fig. 2. For this purpose the master film of Fig. 2 is copied 192 times, 128 of these copies being used for cutting and forming the portion of the finished composite film for controlling the progressive writing display as will be described, and the remaining 64 copies being used to form the portion of the composite film which controls the sustained display of the completed writing.

A long piece of clear film 37 (Fig. 3) is marked at equal intervals of length $d$ equal to the length of the master film. One of the said 128 copies is then severed $\frac{1}{128}$ of its length this $\frac{1}{128}$ section being designated as unit #1 and is cemented or otherwise mounted at the leading end of film 37 as indicated by the numeral 38 (Fig. 3). The remaining $\frac{127}{128}$ of this copy are discarded. The next one of the original 128 copies of the master film is severed at $\frac{2}{128}$ of its length to form a second unit which includes a copy of unit #1. This second unit is then cemented to film 37 at the beginning of the second length $d$ of the latter, as indicated by the numeral 39. The third one of the original 128 copies of the master film is severed $\frac{3}{128}$ of its length to form a third unit which includes a copy of units #1 and #2, and this third unit is cemented to the film 37 at the beginning of the third length $d$ of the latter, as indicated by the numeral 40. This process is repeated for the succeeding sections of film 37 until the complete length of the 128th copy of the master film is cemented to film 37 as indicated by numeral 41. Since the writing when completed is to remain on the fluorescent screen of the cathode ray tube for an additional two seconds after completion, the 64 copies mentioned above are assembled end-to-end as shown in Fig. 4 and are cemented to film 37 at the point 42. The composite film is then preferably condensed in length in any well-known manner by printing it on to another film which runs slower than the composite film, the exposure of the condensed film being through a narrow slit 43 interposed in the path of the printing light 44 and the exposed condensed film 45, this slit extending transversely of the film.

An alternative method of preparing the composite film is as follows. The master film of Fig. 2 is run over a sensitized film 192 times in succession, but each time over unexposed film, so that the new film is 192 times as long as the master and may be said to have 192 sections similar to the composite film above described. The first section is made by running with all of the master masked except $\frac{1}{128}$. The second section is made by running with all of the master masked except $\frac{2}{128}$. Each section contains one more of the 128 parts of the original added until the 128th section contains the entire master. The master is then printed again 64 times completely, or 32 times for each second the complete writing or message is to be reproduced. This composite film may then be condensed as above described.

The preferred manner of employing the finished condensed composite film is schematically illustrated in Fig. 5, wherein the numeral 50 indicates any well-known form of cathode ray tube having an electron gun 51, a control electrode 52 for controlling the intensity of the fluorescent spot on the fluorescent screen, one or more anodes or accelerating electrodes 53, horizontal deflecting plates 54, 55 and vertical deflecting plates 56, 57. The composite condensed film 45 is fed, preferably in a continuous motion in front of two light sensitive or photoelectric cells 58, 59 the film being illuminated by narrow transverse bands or strips of light produced by the lamps 60, 61 and the associated slits 62, 63 in an opaque aperture plate 64. The cells 58, 59 are connected to respective amplifiers 65, 66 preferably of the D. C. amplifying type. The output of amplifier 65 controls the potentials of the deflecting plates 56, 57 and the output of amplifier 66 controls the potentials of the deflecting plates 54, 55. Since these potentials are in proportion to the instantaneous width of the associated records 34, 35 on the composite film, the instantaneous position of the cathode ray beam will likewise be controlled. The potentials and circuits can be so adjusted for example that when the records 34, 35 are of the maximum black area the fluorescent spot on screen 52 is focussed at the lower left corner of a square within which the screen 52 is inscribed, in other words the spot is focussed off the screen on a line at 45 degrees from the horizontal or vertical. Now suppose the cathode ray beam is to trace a line which is vertically straight and at the middle of the screen. Under these conditions the record 34 for the horizontal movement of the beam will be of a certain width of blackness, which by the action of the cell 59 and the D. C. amplifier 66 will move the fluorescent spot to the middle of the screen. The width of the black record 34 will remain constant so long as the vertical line is to remain on the center of the screen. The record 35 for the vertical movement meanwhile will vary in width of blackness so that as the film moves, the voltage developed by the D. C. amplifier 65, applied to plates 56, 57 will move the spot up and down. Assume now that a circle is to appear on the screen, and the circle is to be traced rapidly in a counterclockwise direction, assuming the tracing of the circle starts at the top of the screen 52. The vertical control track 35 begins to increase in width to move the spot down, and continues to increases in width until the spot reaches the bottom of the circle; meanwhile the horizontal control track 34 has increased in width until one quarter of the circle has been traced, then starts to decrease in width for the next quarter of the circle. Continuing from the point where half of the circle has been traced, the vertical track decreased in width until the spot reaches the top; the horizontal track decreased in width until another quarter circle has been traced, then it increases in width until the starting point has been reached. In other words the distance of the fluorescent spot from the left edge of the screen is proportional at any instant to the width of the track 34 for the horizontal movement, and the distance from the bottom edge of the screen is proportional to the width of the track 35 controlling the vertical movement. It will be obvious that instead of employing tracks of variable width or area tracks of variable density may be employed, or tracks of both variable area and variable density, in a similar manner that such tracks are used in "talking film" records.

Where the display matter is a word or a sentence to be spelled out on the screen, the entire message is preferably traced a minimum of about twelve times per second, by successive repetitions of the original record.

The arrangements described while they are primarily advantageous in the telautographic, advertising or display fields, nevertheless are also applicable to television and picture transmission systems. Thus the shutters 19, 23 instead of being operated by a mechanical linkage system may be operated electrically under control of any well known form of scanning equipment. If it is desired to vary the brilliancy of the matter being reproduced the record 36 is reproduced on the composite film, and this record is used to control a photoelectric cell 67 and amplifier 68 whereby the intensity of the cathode ray beam in tube 50 is varied by the control electrode 69 in the known manner.

It will be understood that while certain forms of apparatus are described, these are merely representative of the preferred manner of practising the invention and variations and modifications may be made therein without departing from the spirit and scope of the invention. For example, while the above description specifically refers to the making of 192 copies of the master film, this is merely chosen as a representative number. As is well known in television systems, the steadiness of the image produced on a cathode-ray screen is a function of the number of times the image is retraced and the system as described assumes 32 retracings of the image per second. It is obvious therefore that a less number of tracings may be employed. If the number of tracings per second is represented by $a$, and the time to complete one complete progressive tracing of a given display is $b$ seconds and if the writing when completed is to remain on the screen for $c$ seconds, then the number of copies of the master film will be $a(b+c)$. In some types of cathode-ray tubes, the luminescence on the cathode-ray screen persists for a considerably longer time than is the case with tubes designed for normal television use. Consequently with tubes of the former type the number of tracings per second can be considerably reduced, and likewise the number of copies of the master film can be reduced.

What I claim is:

In an apparatus of the character described the combination of a pantographic tracing member, a pair of light controlling shutters pantographically, means to operate said shutters under control of said tracing member, means to make two distinct records under control of said shutters, and a cathode ray tube having deflection elements energized under control of said records.

GEORGE D. O'NEILL.